(12) United States Patent
Johnson

(10) Patent No.: US 7,320,032 B2
(45) Date of Patent: Jan. 15, 2008

(54) METHODS AND STRUCTURE FOR REDUCING RESOURCE HOGGING

(75) Inventor: Teddy Christian Johnson, Issaquah, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1501 days.

(21) Appl. No.: 09/862,355

(22) Filed: May 21, 2001

(65) Prior Publication Data

US 2002/0174220 A1    Nov. 21, 2002

(51) Int. Cl.
  *G06F 15/173* (2006.01)
  *H04J 1/10* (2006.01)
(52) U.S. Cl. ................. 709/225; 709/226; 370/229
(58) Field of Classification Search ............... 709/227, 709/225, 226, 229, 235, 224, 223, 217; 370/229, 370/230, 230.1, 231, 232, 233, 234, 235, 370/236.1, 237, 464, 465
  See application file for complete search history.

(56) References Cited

U.S. PATENT DOCUMENTS

| | | | | |
|---|---|---|---|---|
| 5,418,912 A | * | 5/1995 | Christenson | ................. 709/234 |
| 5,913,041 A | | 6/1999 | Ramanathan et al. | .. 395/200.63 |
| 5,961,598 A | * | 10/1999 | Sime | ........................ 709/224 |
| 6,003,032 A | | 12/1999 | Bunney et al. | ............... 707/10 |
| 6,047,322 A | | 4/2000 | Vaid et al. | .................. 709/224 |
| 6,055,577 A | * | 4/2000 | Lee et al. | .................... 709/233 |
| 6,058,399 A | | 5/2000 | Morag et al. | ................ 707/201 |
| 6,078,953 A | | 6/2000 | Vaid et al. | ................... 709/223 |
| 6,119,160 A | * | 9/2000 | Zhang et al. | ............... 709/224 |
| 6,119,235 A | | 9/2000 | Vaid et al. | ................... 713/201 |
| 6,137,777 A | | 10/2000 | Vaid et al. | ................... 370/230 |
| 6,141,686 A | | 10/2000 | Jackowski et al. | .......... 709/224 |
| 6,442,608 B1 | * | 8/2002 | Knight et al. | ............... 709/225 |
| 6,529,955 B1 | * | 3/2003 | Sitaraman et al. | .......... 709/225 |
| 6,751,668 B1 | * | 6/2004 | Lin et al. | .................... 709/227 |

\* cited by examiner

*Primary Examiner*—Nathan Flynn
*Assistant Examiner*—Ashok Patel

(57) ABSTRACT

Methods and associated structures for limiting the number of sessions presently active between a server process and client processes distributed over a number of computing devices on a network. The methods and associated structures serve to reduce resource hogging by a particular computing device on a network and thereby reduce opportunities for denial of service attacks on the security of a server node. The server process maintains a session log to record each presently active session between the server process and a computing node identified by a source identifier provided by the client with the establishment and termination of each session. When the number of such active sessions for a particular source identity exceeds the predetermined threshold further requests to establish new sessions associated with that same source identity are rejected by the server process. One useful application of the present invention is in Internet FTP servers to log and track utilization of the server resources by the IP address of the computing device that initiates each FTP session.

16 Claims, 2 Drawing Sheets

METHODS AND STRUCTURE FOR REDUCING RESOURCE HOGGING

BACKGROUND OF THE INVENTION

1. Field of the Invention

The present invention relates to client/server architectures and in particular to techniques and structures for reducing resource hogging of server resources by clients on a computing node.

2. Discussion of Related Art

Client/server software architectures are common in modern computing applications. In such architectures one or more client processes issues requests to a server process for particular services. The server process performs the desired service and returns status and/or requested data to the requesting client process.

Such client/server architectures are at the heart of most distributed computing applications. Client processes and the server process may be physically dispersed among the plurality of computing devices interconnected via networked computing media. Client processes generate requests for service and transmit the request to an appropriate server process via the network communication media. The server process receives such requests via the network communication media, performs appropriate processing, and returns any required data or status via the same network communication media.

The Internet is a well-known network where distributed computing applications that utilize client/server architectures are common. Client processes such as Web browsers, chat programs, file transfer programs, etc. issue requests and transmit those requests via the Internet network communication media to identified server processes. At some potentially remote location, a server process receives the Web, chat, file transfer, etc. request, processes the request, and returns appropriate status and/or data to the client process. Often the client process is associated with a particular user and a user may generate a plurality of such clients. For example, a user may spawn multiple Web browser clients or file transfer ("FTP") clients to process multiple requests in parallel from the users computing node.

Often in such client/server applications, a single server process is responsible for servicing requests from a large number of client processes. For example, in the Internet, a single Web server node may service requests from literally thousands if not millions of Web browser client processes. It is possible in such client/server architectures for a single user to overutilize resources of a single server process. A single user could generate multiple client processes for requesting the services of the single server process. Such a user may then receive a disproportionate share of the resources of the single server process as compared to other users generating requests via a single client process. As used herein, "user" may mean a single human operator or may simply refer to a collection of related processes. Another term often used for such collections of related processes is a "session." In other words, a single session may overutilize or "hog" scarce resources of one or more server processes.

Exemplary of such resource hogging is a computer security problem often referred to as a "denial of service" attack. Where one or more sessions intentionally overutilize resources of a single server, other sessions (users) may be denied the services of that server process. For example, if a single interactive user initiates a large number of Web browser client processes requesting information from the same Web site (sometimes serviced by a single server process), other legitimate users may be denied adequate service by that same Web server. Likewise, a single user initiating a large number of file transfer client processes denies other users the capability of requesting file transfers from that same file transfer server process.

It is evident from the above discussion that a need exists for improved capabilities to limit resource hogging by particular identified sessions in such client/server architectures. In particular, a need exists to reduce resource hogging in file transfer protocols often used in distributed computing architectures.

SUMMARY OF THE INVENTION

The present invention solves the above and other problems, thereby advancing the state of the useful arts, by providing structure and associated methods for monitoring and controlling usage of a server process' resources by client sessions to reduce the potential for resource hogging by a particular session. In particular, the present invention provides for determining and logging the identity of the source of a client process request by the server process. When new requests arrive at the server process requesting the establishment of a new session, the server process queries a log of currently active sessions to determine whether the new session is permitted to interact with the server process.

In a first preferred embodiment, a predefined threshold limit number of sessions may be initiated from any given source identity. The source identity is preferably the IP address (in the TCP/IP protocols) of the computing node from which the client process is operating. Each new session requesting services from the server process causes the server process to inspect the log to determine the number of sessions presently active between the server process and the computing node identified by the source identity of the new request. If the number so determined is below a threshold value, the new session is established by the server process. Each such new session causes the server process to record in the log information indicating another active session associated with the IP address on which the client process is operating. When the number of sessions would exceed a predetermined threshold, the server process rejects the client request to establish a new session with the server process.

FTP is a common protocol on the Internet for transferring files between an FTP client and an FTP server. Once such an FTP session is established, the volume of data transferred may be quite large thereby utilizing valuable bandwidth resources of the server process. In a best presently known mode of practicing the invention, an FTP server process uses the IP address embedded within the FTP client process "open" requests directed to the FTP server process as the source identity for the establishment of a new session. If a single IP address is the source identity for an excessive number of FTP client session open requests, new client session requests are rejected by the FTP server process. In this manner, the present invention prevents denial of service attacks by overutilization of FTP server process resources from a particular remote computing device.

A first aspect of the invention provides a method operable within a server process for reducing resource hogging of said server process comprising the steps of: receiving a request from a client process to establish a session with the server process; determining, from the request, a source identity attribute associated with the client process; determining whether a new session may be established between based on said source identity; and rejecting the request in response to a determination based on said source identity attribute that no new session may be established. Another aspect of the invention provides that the step of determining whether a new session may be established comprises the steps of: determining a number of presently active sessions between the server process and other client processes having the same source identity attribute; comparing that number with a predetermined threshold value; and determining that no new session may be established when the number of sessions is greater than the threshold value. Another aspect of the invention records log information in a log regarding each of presently active sessions where the log information includes the source identity attribute of the client process that requested establishment of each active sessions. Another aspect of the invention provides that the number of presently active sessions is determined by counting the number of entries of log information having the same source identity attribute as the source identity attribute value from the request. Still another aspect of the invention provides that recording the log includes incrementing a counter associated with a particular source identity attribute value in the log to indicate the start of a corresponding presently active session; and decrementing the counter in response to termination of the corresponding presently active session and then determining the number of presently active sessions as the present value of the counter. Still another aspect of the invention provides that the source identity attribute is the IP address of the computing device on which the client process is operable. Still further, the client and server processes may be FTP protocol client and server processes.

DETAILED DESCRIPTION OF THE PREFERRED EMBODIMENTS

Figure 1:
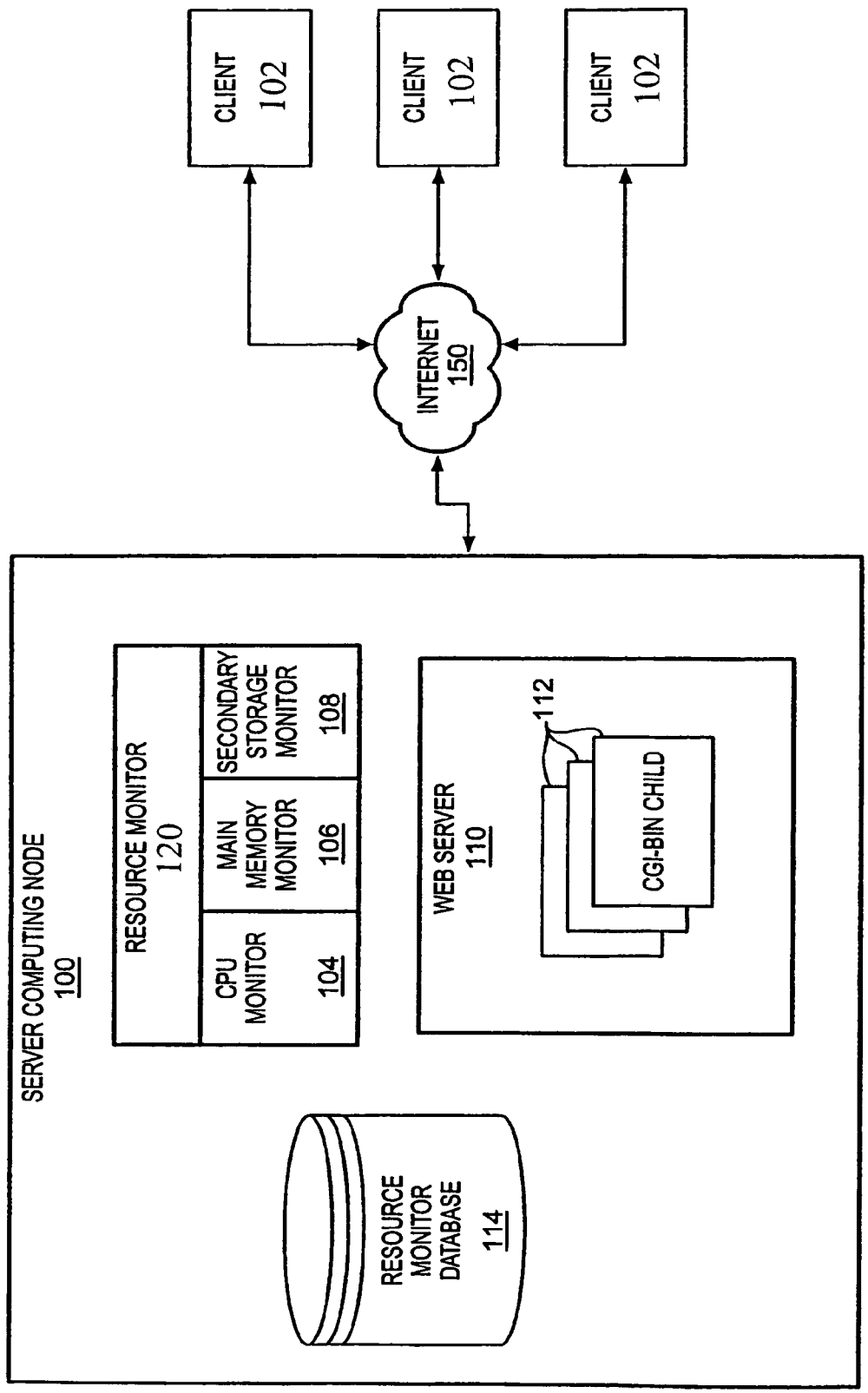
FIG. 1 is a block diagram of a system in accordance with the present invention having a server process that logs session activity to preclude resource hogging by client processes from any particular computing node.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of a system operable in accordance with the present invention. In particular, server process 100 services requests from a plurality of client processes 102. As is known in the art, client processes 102 may be physically distributed over any number of computing devices. Further, server process 100 may be physically co-resident within the same computing device as one or more of the client processes or may be operable on a separate computing device (not shown) independent of the computing devices on which client processes 102 are operable. Such design choices in distributed computing applications are well-known to those of ordinary skill in the art.

Client processes 102 as exemplified in FIG. 1 are distributed over four computing devices, namely 104, 106, 108 and 110. Computing devices 104 through 110 are coupled to server process 100 via network communication media. Computing devices 104 and 106 are intended to suggest local network connectivity (i.e., intranet connectivity) to the server process 100. Computing devices 108 and 110 represent remote computing devices coupled to server 100 through, for example, Internet 150.

As shown in FIG. 1, computing device 104 hosts a single client process 102. Computing device 106 hosts three client processes 102. Computing devices 108 and 110 each host two client processes 102. The specific number of computing devices and client processes shown in FIG. 1 are merely intended as exemplary to suggest a distributed computing architecture in which a plurality of client processes are coupled to, and serviced by, a single server process 100. Those skilled in the art will recognize that any number of computing devices, server processes, and client processes may be coupled in a similar manner for the needs of a particular computing application.

FIG. 1 is also intended to suggest that different computing devices coupled to server process 100 may utilize varying quantities of resources available from server process 100. In the schematic diagram of FIG. 1, computing device 106 is suggestive of utilizing three times the resources provided by server process 100 as compared to computing device 104 due to the fact that indicates three client processes operable within computing device 106 as compared to one in device 104. Obviously the exact load imposed by any particular client process is affected by many factors. The number of such client processes does not therefore determine the exact load imposed on the server process however it is one factor in the total load imposed on such a server process. Those skilled in the art will recognize that FIG. 1 is merely intended to be suggestive of such a loading distribution and the variance of the loading from such distributed client processes.

As noted above, it may be desirable in particular computing applications to regulate or control the maximum resource utilization by any single computing device coupled to server process 100. In particular, it is desirable to prevent resource hogging by a particular computing device. Such resource hogging it is a common tactic utilized in "denial of service" attacks on the security of computing enterprises.

In accordance with the present invention, session monitor 120 in server process 100 maintains a log of sessions 112. Each client process 102 that attempts to establish a connection to (a session) server process 100 causes session monitor 120 to inquire of log 112 to determine whether additional sessions from the corresponding computing device will be permitted. In particular, session monitor 120 records in log 112 the source identity of the computing device from which a new client process 102 is requesting a connection. When the number of such established sessions recorded in log 112 by session monitor 120 exceeds a predetermined threshold value, new requests to establish a session from additional client processes from the same source computing device will be rejected.

Those skilled in the art will further recognize that the structure shown within server process 100 may be implemented in a variety of equivalent structures and forms. In particular, session log 112 may be recorded in RAM memory variables associated with the server process 100 operation or may be recorded in a non-volatile memory if required for a particular application such as a disk storage or other non-volatile memory devices and structures. Further, session monitor 120 may be implemented as a program element within the server process 100 or may be a separate element that intercepts initial requests from clients and only passes the requests on to other elements of the server process when new sessions are permitted. Such design choices are well known to those skilled in the art. FIG. 1 is therefore intended as a schematic representation of elements of the present invention and their relationships with other aspects of a system utilizing the present invention.

Figure 2:
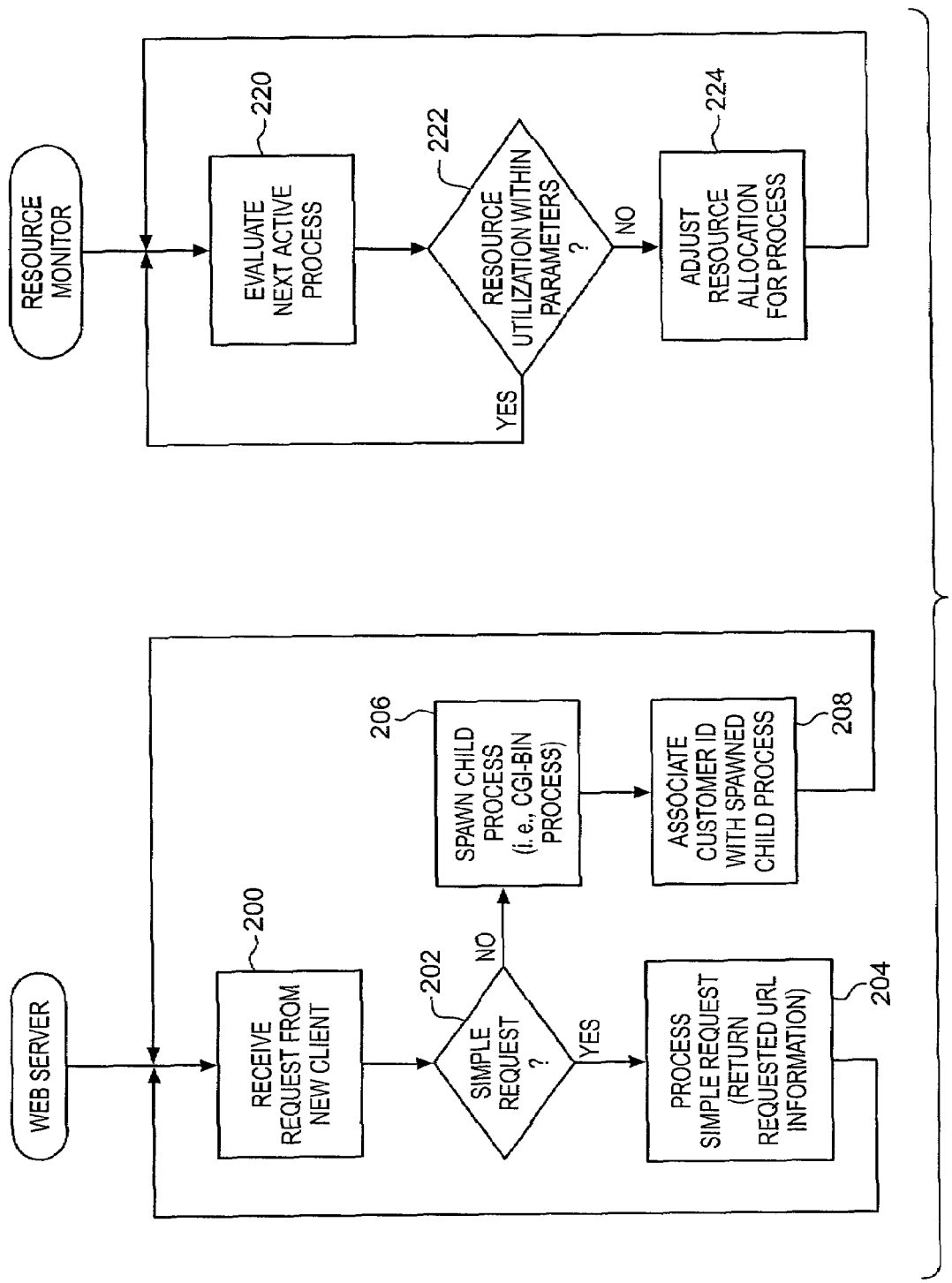
FIG. 2 is a flowchart describing the method of the present invention operable within a server process to preclude resource hogging by client processes from any particular computing node.

FIG. 2 is a flowchart describing a method operable within server process 100 to implement the features of the present invention to reduce resource hogging by a particular computing device. Element 200 is operable to await receipt of a incoming requests from client processes coupled to the server process. Element 202 then determines whether a received incoming request is a request to establish a new session by a client process.

A number of equivalent techniques may be used to determine that a request requires establishment of a new session. In one preferred embodiment, information contained in the request itself preferably identifies that the request requires establishment of a new session connection. For example, in the standard Internet file transfer protocol ("FTP") an FTP "open" request is the first request from a new client process to establish a connection with the FTP server process. This open request includes other information used (as discussed below) to identify the source of the request.

If element 202 determines that the incoming request requires establishing a new session with the server, processing continues at element 204. Element 204 examines the incoming request to obtain source identity information regarding the requesting client. For example, in the standard Internet file transfer protocol (FTP), the initial open request includes identity information regarding the source of the requesting client process. Specifically, the FTP open request includes the IP address of the source computing device on which the requesting client is operating. Other common networking protocols using client/server architectures include similar source identity information. Those skilled in the art will recognize the applicability of the present invention to any such networking protocols.

Having so obtained source identity information from the incoming request, element 206 is then operable to look up the obtain source identity information in a session log maintained by the server process. Element 208 then determines whether the predetermined session threshold has been exceeded with respect to the computing device identified as the source of the requesting client. If the threshold has in fact been exceeded, the server process 100 is operable to reject the new session request by returning an appropriate error status to the client process having requested the establishment of a new session. Processing then continues by looping back to element 200 to await receipt of further incoming requests. If element 208 determines that the session threshold has not been exceeded, the server process 100 is operable to commence processing on behalf of a new session originated from the identified source computing device. The session log is updated to reflect an additional session presently active for that identified computing device.

If element 202 determines that the incoming request is other than a request to establish a new session, the server process 100 is then operable to determine whether the request is for ending or completing an existing session. If so, the server process 100 is next operable to perform processing appropriate to complete the identified session and to update the session log to reflect one less session presently active on behalf of the identified source computing device. If the server process 100 determines that the incoming request is for other than completing an existing session, the server process 100 is operable to perform appropriate processing for such other requests in accordance with standard features of the particular client/server application and network protocols. In both cases, processing then continues by looping back to element 200 to await receipt of further incoming requests.

In one exemplary preferred embodiment, the Internet standard FTP protocol supplies the requisite source identity information in message packets starting and ending each session. Those skilled in the art will readily recognize that any client/server application and communication protocol that includes such source identity information may be used in conjunction with the method of the present invention shown in FIG. 2. Any such protocol that includes source identity for establishment and termination of each session can be controlled in this manner to preclude resource hogging and thereby reduce potential denial of service attacks on the security of a server system.

Those skilled in the art will readily recognize a variety of data structures useful for generating, manipulating and maintaining the session log used by the process of FIG. 2 for controlling resource allocation for each attached computing node. For example, the session log may consist of a simple list of presently active sessions including the source identity information for each session. When a new session is initiated, a new record is written to the session log indicating the activation of a new session and the source identity information associated with the client process that requested the new session. When a session completes, the record corresponding to that session is deleted from the session log. The determination as to whether a predetermined threshold has been exceeded 220 then simply amounts to counting the number of records presently in the session log that relate to the source identifier accompanying the new session request. If the number of presently active sessions indicated in the session log exceeds the predetermined threshold value 222, establishment of a new session is denied: Alternatively, a session log may include records indicating the source identity of a particular computing node and an accompanying count field indicative of the present number of sessions active between the server and the computing node associated with the source identity. In such a case, adding a new session consists essentially of locating an existing record for the supplied source identity or creating a new record if the source identity is not presently found in the session log. Once such a record is found or created, the associated count field is incremented by one for each new session created and decremented by one for each session completed 224. Determining whether the predetermined threshold has been exceeded then simply comprises locating the record corresponding to the supplied source identity (or creating such a record if it does not exist) and then comparing the present value of the count field to the predetermined threshold value. Those of ordinary skill in the art will recognize a wide variety of equivalent structures and techniques for generating and maintaining such a session log.

Further, the session log may be stored within the memory space of the server process or may be recorded in a non-volatile memory such as a disk file associated with the computing system. Such design choices for locating the session logging in storage are well-known to those of ordinary skill the art.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method operable within a server process for reducing resource hogging of said server process comprising the steps of:

receiving a request from a client process to establish a session with said server process;

determining a source identity attribute associated with said client process from said request;

determining whether a new session may be established between said client process and said server process based on said source identity; and rejecting said request in response to a determination based on said source identity attribute that no new session may be established between said client process and said server process to limit a number of sessions active between the server process and the client process to a predetermined threshold value.

2. The method of claim 1 wherein the step of determining whether a new session may be established comprises the steps of:
   determining a number of presently active sessions between said server process and other client processes having the same said source identity attribute;
   comparing said number of sessions with the predetermined threshold value; and
   determining that no new session may be established when said number of sessions is greater than said threshold value.

3. The method of claim 2 further comprising the step of:
   recording log information in a log regarding each of said presently active sessions wherein said log information includes the source identity attribute of the client process that requested establishment of said each of said presently active sessions.

4. The method of claim 3 wherein the step of determining the number of presently active sessions comprises the step of:
   counting the number of entries of log information in said log having the same source identity attribute as said source identity attribute value from said request.

5. The method of claim 3 wherein the step of recording includes the steps of:
   incrementing a counter associated with a particular source identity attribute value in said log to indicate the start of a corresponding presently active session; and
   decrementing said counter in response to termination of said corresponding presently active session.

6. The method of claim 5 wherein the step of determining the number of presently active sessions comprises the step of:
   determining the present value of said counter.

7. The method of claim 1 wherein said server process and said client process utilize TCP/IP protocols to communicate and wherein the step of determining a source identity attribute comprises the step of:
   determining the IP address of the computing device on which said client process is operable.

8. The method of claim 7 wherein said server process is an FTP server process and wherein said client process is an FTP client process.

9. A method for limiting FTP client processes from hogging the resources of an FTP server process comprising the steps of:
   receiving within said FTP server process a request to establish a new session from an FTP client process;
   identifying the IP address of a computing device on which said FTP client process is operable;
   determining, using the IP address of the computing device, the number of presently active sessions within said FTP server process previously established with FTP client processes operating on said computing device;
   comparing said number of presently active sessions with a predetermined threshold value;
   rejecting said request in response to a determination that said number of presently active sessions exceeds said predetermined threshold value.

10. The method of claim 9 further comprising the steps of:
    recording log information in a log indicating start of a presently active session; and
    associating said log information with the IP address of the computing device hosting the FTP client process requesting the start of said presently active session.

11. The method of claim 10 wherein the step of determining the number of presently active sessions comprises the step of:
    counting the number of entries in said log having the same IP address as said IP address of said computing device on which said FTP client process is operable.

12. The method of claim 10 wherein the step of recording includes the steps of:
    incrementing a counter associated with an IP address in said log in response to start of a corresponding session; and
    decrementing said counter in response to termination of said corresponding session.

13. The method of claim 12 wherein the step of determining the number of presently active sessions comprises the step of:
    determining the present value of said counter.

14. A system for reducing resource hogging in a client/server environment comprising:
    a network communication medium;
    a server process coupled to said network communication medium;
    a client process coupled to said server process via said network communication medium;
    a log memory associated with said server process for storing log information relating to sessions between said server process and any client process; and
    a session monitor associated with said server process to determine from said log information whether to grant a request to establish a new session from said client process and limit a number of sessions active between the server process and the client process to a predetermined threshold value.

15. The system of claim 14
    wherein said request includes source identity information to identify a computing device on which said client process is operating,
    wherein said log information includes corresponding source identity information for sessions presently active between said server process and any client process, and
    wherein said session monitor is operable to determine whether to grant said request based on said source identity information in said request and based on said log information having the same source identity information as said request.

16. The system of claim 15 wherein said server process and said client process communicate via said network communication medium using TCP/IP protocols and wherein said source identity information comprises the IP address of the computing device on which a corresponding client process is operating.

* * * * *